(12) United States Patent
Day (10) Patent No.: US 7,760,077 B2
(45) Date of Patent: Jul. 20, 2010

(54) ESTABLISHING AND SECURING A UNIQUE WIRELESS RF LINK BETWEEN A TRACTOR AND A TRAILER USING A WIRED CONNECTION

(75) Inventor: Jeffrey Lee Day, Lexington, NC (US)

(73) Assignee: QUALCOMM Incorporated, San Diego, CA (US)

( * ) Notice: Subject to any disclaimer, the term of this patent is extended or adjusted under 35 U.S.C. 154(b) by 324 days.

(21) Appl. No.: 11/758,478

(22) Filed: Jun. 5, 2007

(65) Prior Publication Data
US 2008/0303648 A1 Dec. 11, 2008

(51) Int. Cl.
G08B 21/00 (2006.01)

(52) U.S. Cl. ...................................... 340/431

(58) Field of Classification Search ................. 340/431, 340/825.69, 539.1; 705/50; 713/168
See application file for complete search history.

(56) References Cited

U.S. PATENT DOCUMENTS

| | | | |
|---|---|---|---|
| 4,928,274 A | 5/1990 | Gilhousen et al. | |
| 4,979,170 A | 12/1990 | Gilhousen et al. | |
| 5,017,926 A | 5/1991 | Ames et al. | |
| 6,124,810 A | 9/2000 | Segal et al. | |
| 6,526,335 B1 | 2/2003 | Treyz et al. | |
| 7,064,656 B2 * | 6/2006 | Belcher et al. | 340/425.5 |
| 7,137,674 B2 * | 11/2006 | Goebels | 303/191 |
| 2002/0030590 A1 | 3/2002 | Dieckmann et al. | |
| 2004/0098581 A1 | 5/2004 | Balfanz et al. | |
| 2004/0196977 A1 * | 10/2004 | Johnson et al. | 380/270 |
| 2004/0252025 A1 * | 12/2004 | Silverbrook et al. | 340/568.5 |
| 2005/0062590 A1 * | 3/2005 | Lang et al. | 340/431 |
| 2005/0177466 A1 * | 8/2005 | Willins | 705/28 |
| 2005/0193199 A1 | 9/2005 | Asokan et al. | |
| 2007/0026850 A1 | 2/2007 | Keohane et al. | |
| 2007/0036358 A1 | 2/2007 | Nguyen et al. | |
| 2007/0072553 A1 | 3/2007 | Barbera | |
| 2007/0106892 A1 * | 5/2007 | Engberg | 713/168 |

FOREIGN PATENT DOCUMENTS

WO 02082742 10/2002

OTHER PUBLICATIONS

International Search Report, PCT/US2008/065538. International Search Authority - European Patent Office. Sep. 30, 2009.
Written Opinion of the International Search Authority, PCT/US2008/065538. International Search Authority - European Patent Office. Sep. 30, 2009.

* cited by examiner

*Primary Examiner*—Phung Nguyen
(74) *Attorney, Agent, or Firm*—Ashish L. Patel

(57) ABSTRACT

Communications between a tractor and trailer are established and secured using a wired connection between the physically connected tractor and trailer. Wireless ID or authentication information is communicated between tractor and trailer using the wired connection. Thereafter, a wireless, secure RF communication link may be established between the tractor and trailer using the ID/authentication information. Further, wireless messages may be encrypted between tractor and trailer using the identification/authentication information received over the wired connection.

38 Claims, 5 Drawing Sheets

ESTABLISHING AND SECURING A UNIQUE WIRELESS RF LINK BETWEEN A TRACTOR AND A TRAILER USING A WIRED CONNECTION

BACKGROUND

Data communication systems have been developed for use between vehicles and remote locations for many years. For instance, tractor/trailer combinations have been used in the trucking industry to transport cargo over the roadways while in contact with a network management facility (NMF) and/or dispatch center. However, there is a dearth of systems providing communications between a tractor and trailer which are mechanically coupled together enabling the tractor to pull the trailer. Vehicle subsystems may be powered and controlled using communication links between the tractor and trailer. These subsystems include hydraulic, pneumatic, electrical, and other subsystems connecting the tractor with the trailer using electrical conductors and pneumatic lines. Many of the connections between the tractor and trailer, (generally together considered as a vehicle and commonly referred to as a "rig,") are standardized permitting quick-disconnect, coupling, and interchange using standardized connectors and couplers among various rig components, such as tractors, trailers and dollies (short trailers used to couple multiple trailer strings).

The dynamics of the trucking and shipping industry provide that a tractor will be connected and detached from different trailers during the course of its useful life. The standardization of connections also permits rig equipment, including the tractor and trailer to be leased, rented, loaned, sold or traded among various entities. Typically, a trailer may be hauled to a first destination, detached from a tractor and subsequently delivered to a second location by another tractor. Consequently, over its operational lifetime, a trailer may be under the control of several different concerns, including various carriers, truck brokers, trucking companies, railroads, overseas shippers, etc. Also, different operators may be at the immediate control of a tractor/trailer, etc. Various methods have been devised to track rigs and their components over the course of a delivery schedule. Untethered trailer tracking such as T2™, a well-known untethered trailer tracking system provided by QUALCOMM Inc. is used to track trailers and it may be used to track shipping containers as well. A primary purpose of un-tethered trailer tracking includes ensuring that a trailer has not been parked somewhere unused for a long period of time, e.g. years. Current systems do not readily offer an untethered communication system between tractor and trailer. Further, attempting to employ the widely used 7-pin connectors operating according to tethered protocols pursuant to standards such as Society of Automotive Engineering (SAE) J1939 (Recommended Practice for a Serial Control & Communications Vehicle Network), SAE J1708 (Serial Date Communications Between Microcomputer Systems In Heavy Duty Vehicle Applications) and SAE J1587 (Electronic Data Interchange between Microcomputer Systems in Heavy-Duty Vehicle Applications), etc. may be fraught with problems.

Communication on a data bus between a tractor and a trailer may be problematic due to the nature of the standards such as SAE J1708 and J1939. For instance, a data bus using the J1708 standard uses a differentially driven, twisted pair of wires. Further, the data bus of this system is half-duplexed such that data transmitted on the data bus is transmitted on both of the twisted pair of wires. Consequently, data transmitted on one of the twisted pair of wires is mirrored with respect to the other twisted pair of wires. Because data is transmitted on the bus on both wires, there is no separate transmit and receive line for the data bus. Consequently, systems needing to transmit data on the data bus must monitor the data bus for an idle state in order to get an opportunity to send data. Further, communication over a physical link between tractor and trailer using the 7-pin connector are subject to wear and vibration, frequently resulting in an intermittent electrical connection therebetween which is unsuitable for communications. Moreover, there are no spare electrical connections within the 7-pin connector available to provide a robust communication channel. Due to these constraints, existing tractor/trailer communication systems that utilize the 7-pin connector are very limited in capability, reliability and bandwidth.

As rigs travel between cargo terminals, delivery points, weigh stations, and the like, conventional tracking techniques can be generally classified as cumbersome and limited in effectiveness and information capacity. Frequently, tractors, trailers, and other components are identified using simple numbering systems, i.e., a serial or other number is painted on or otherwise applied to a surface of the component These numbers typically are read and recorded by human operators and the process can be a time-consuming process in an industry based on scheduling and time criticality. The likelihood of human error also increases the probability of mistakes in accounting process involving cargo since record entries may occur during conditions of darkness or obscured visibility.

Serial number or other identification numbers used on trailers or containers may fail to convey a complete cargo identity. Cargo contained within a trailer generally is not identifiable by the trailer's identification number absent a predetermined cross-reference between the number and the cargo. Although such a cross-reference typically can be supplied through a freight management database, elaborate communications systems and recording procedures may be required to ensure data integrity. Failures in the link of the accounting chain may result in erroneous component and cargo designations in a recorded cargo manifest leading to errors in shipments and misplaced components and misplaced containers.

Bar-code or magnetic-stripe identification systems have been employed to reduce the likelihood of human error involved in the numbering of cargo containers and trailers. However, since codes or magnetic stripes and the like are typically affixed to surfaces of the rig which are exposed to wind, rain, salt, and other environmental contaminants, codes and stripes may be rendered unreadable. Further, reading a bar code or magnetic stripe typically requires the close proximity of the reader and the code of stripe. This generally precludes remote reading or reading while the rig is in motion. Additionally, bar codes and magnetic stripes have a relatively limited information capacity.

Radio frequency identification (RFID) systems have been used to track trailers. However, these systems are generally passive and may not be very instrumental in the exchange of a great deal of information. For instance, a reefer, a name often applied to a truck refrigeration unit, has little suitability for use with RFID in the way of offering solutions for monitoring and controlling temperature within a reefer.

Accordingly, there is a need for a system that can result in a reliable wireless communications link between a tractor and trailer or between a tractor and storage container. However, establishing a secure and unique wireless radio frequency (RF) connection between a tractor and a trailer can be problematic in locations such as truck stops and fleet yards where multiple tractors and trailers are in relatively close proximity. Given that RF signals are not limited to line of sight and the range of these signals can be hundreds of feet, it is likely that a RF receiver on a tractor would pickup transmissions from several trailers; not just the trailer to which it is physically connected. Under these circumstances, it would be very difficult for a tractor to identify the trailer(s) with which it should establish a RF connection. The more RF enabled tractors and trailers that are present, the more problematic the situation becomes.

BRIEF DESCRIPTION OF THE DRAWINGS

Applicable reference numerals have been carried forward.

DETAILED DESCRIPTION

Figure 1:
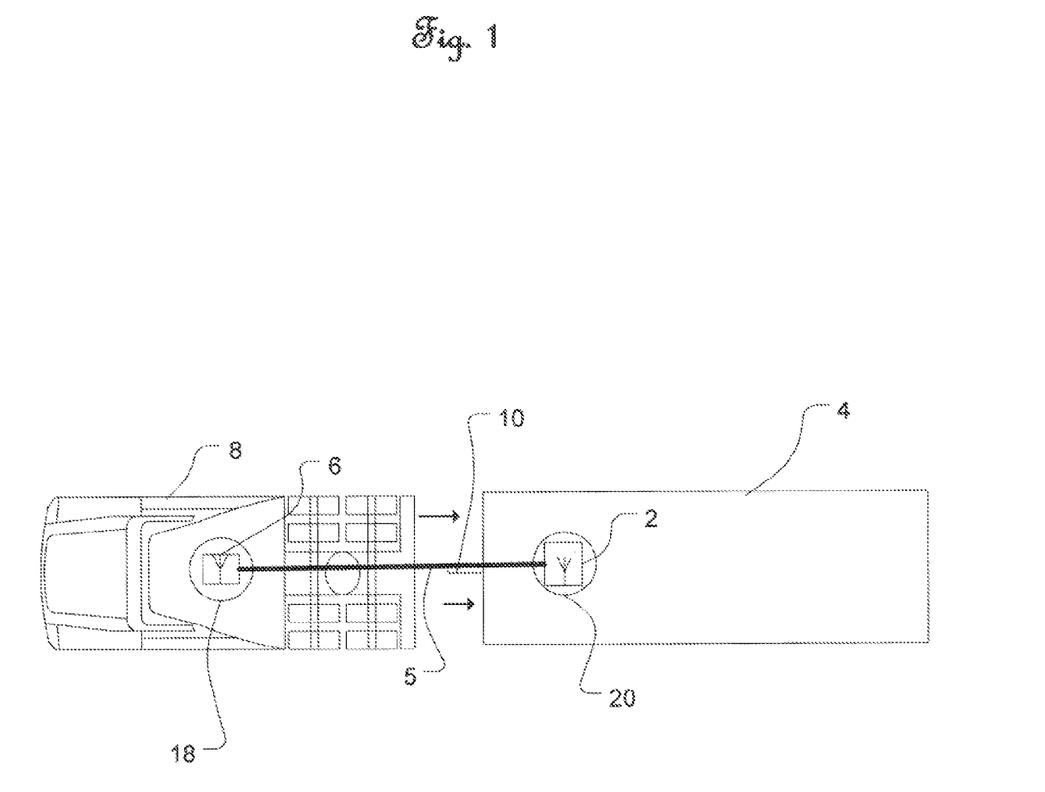
FIG. 1 illustrates a plan view of a system which allows the establishment and securing of a unique wireless RF link between a tractor and a trailer using a wired connection.

The foregoing problem of establishing and securing a unique wireless RF link between a tractor and a trailer may be solved by using a wired connection between the physically connected tractor and trailer(s). FIG. 1, illustrates a plan view of a system which allows the establishment and securing of a unique wireless RF link between a tractor and a trailer using a wired connection. Wireless transceiver, mobile communications terminal (MCT) 2 mounted on or within trailer 4 may send its identification (ID) or authentication (i.e., identification/authentication) information over wired connection 5 to MCT 6 (a wireless transceiver) located in or mounted on tractor 8. Alternatively, MCT 2 and MCT 6 may exchange ID/authentication information over wired connection 5. Still alternatively, MCT 6 may send its ID/authentication information to MCT 2. For ease of illustration, trailer 4 is shown spaced apart from tractor 8. However, in actuality, tractor 8 and trailer 4 are coupled together forming rig 7 with tractor 8 lying closer than illustrated to trailer 4 in the direction of the arrows. MCT 6 of tractor 8 may then establish and authenticate an RF link with MCT 2 of trailer 4 using the information it received over wired connection 5 and/or MCT 2 may then establish and authenticate an RF link with MCT 6 using the information it received over wired connection 5 from MCT 6, as the case may be. Wired connection 5 may be, but is not limited to, one of the existing power line carrier links found on 7-pin connector 10. Communications on wired connection 5 may be modulated over the top of other information possibly carried on wired connection 5.

Wireless communication systems are well known for transmitting information between fixed stations and one or more geographically dispersed mobile receivers carried in trucks or on a piece of equipment. For example, the Global Positioning System (GPS), a system of low earth orbiting satellites, has been used to determine a piece of equipment's or vehicle's position. Further, satellite communication systems have also been used in the trucking industry for many years to provide messaging information between fleet-owned dispatch centers and their respective tractor-trailer vehicles. Such systems offer significant benefits to fleet owners because they allow almost instantaneous communications and real-time position information. An example of such a satellite communication system is disclosed in U.S. Pat. No. 4,979,170 entitled "Alternating Sequential Half Duplex Communication System and Method"; U.S. Pat. No. 4,928,274 entitled "Multiplexed Address Control in a TDM Communication System"; U.S. Pat. No. 5,017,926 entitled "Dual Satellite Navigation System"; and U.S. Pat. No. 6,124,810 entitled "Method and Apparatus for Automatic Event Detection in a Wireless Communication System," all of which are assigned to the assignee of the present invention and all being incorporated herein by reference thereto.

In the satellite communication system described in the above-mentioned patents, fleet-owned dispatch centers communicate using land-based systems such as telephone or fiber-optic networks with a hub, otherwise known as a network management facility (NMF). The NMF acts as a central communication station through which all communications between vehicles and a dispatch center pass. The NMF includes a number of network computers (NMCs), each NMC being responsible for providing a communication path for the NMF to geographically dispersed vehicles and/or equipment in the communication system using a geostationary satellite. A geostationary satellite includes one or more transponders. Transponders relay up and down link signals, (providing amplification and frequency translation) between geographically-dispersed earth stations which may be fixed or in-motion. Each NMC is assigned with different up and down link frequencies in order to avoid interference involving other Mobile Communication Terminals (MCTs) that are operating on the same satellite but with a different NMC. In the satellite communication system of the above referenced patents, each NMC system is capable of handling the communication needs of approximately 30,000 vehicles. Each MCT in the communication system comprises; a transceiver, modulator/demodulator, a CPU and GPS receiver which allows for text message exchange between the driver and dispatcher and position determination of the vehicle.

Figure 2:
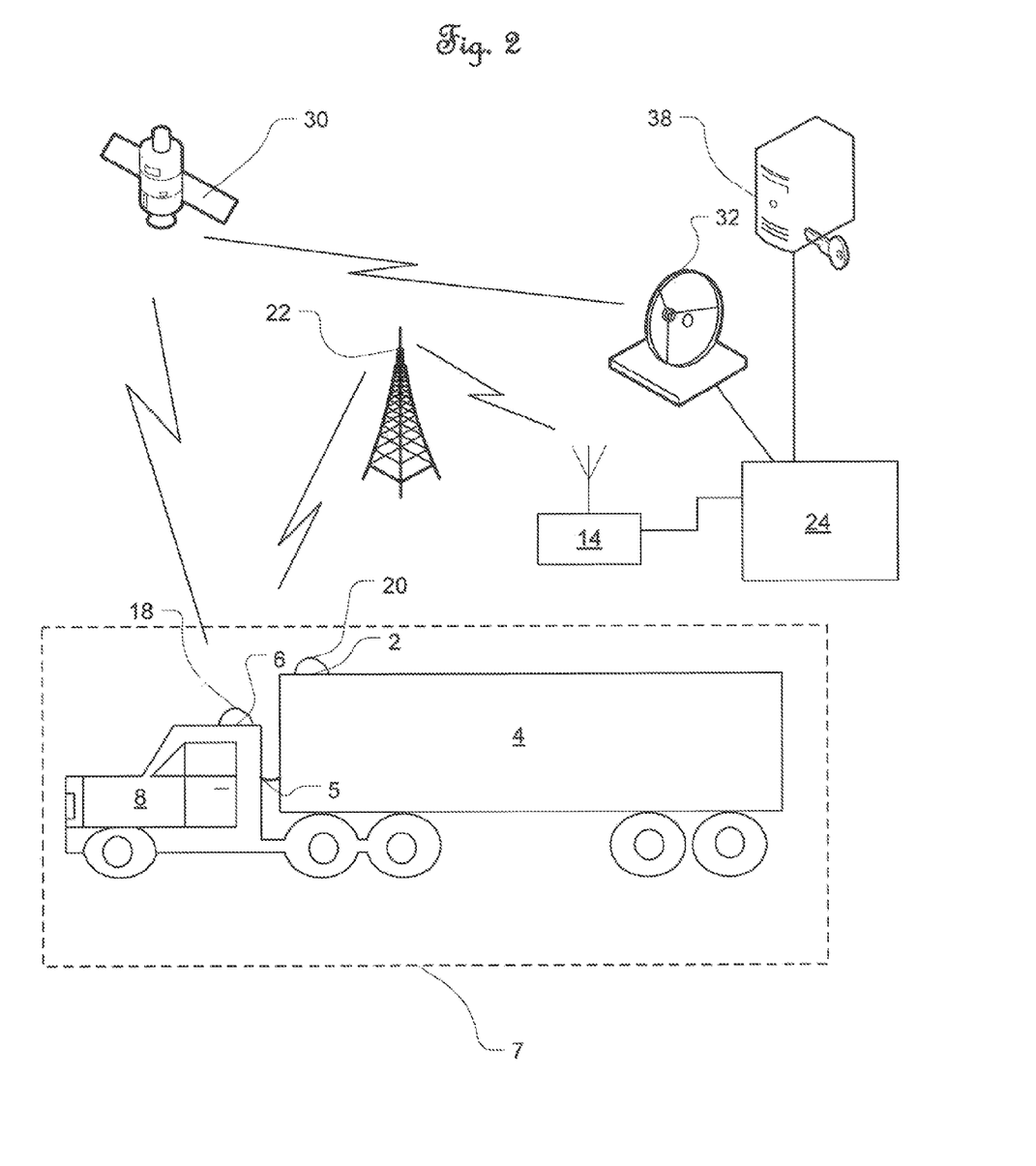
FIG. 2 illustrates a diagram showing a communication system according to some of the embodiments.

FIG. 2, illustrates a diagram showing a communication system according to some of the embodiments herein with MCT 6 shown on tractor 8. In one embodiment, an antenna for MCT 6 may be located within radome 18. Further, as shown in FIGS. 1 and 2, the antenna may placed on a circuit card in MCT 6 which may be mounted within radome 18. A radome is an enclosed housing, usually made of a low-loss dielectric material, that serves to protect antennas or sensors mounted on ground-based vehicles, ships, airplanes and the like without significantly altering the electrical performance of the enclosed antenna(s) or sensor(s). In one aspect of an embodiment, MCT 2, 6 comprise an OnmiTRACS® satellite transceiver manufactured by QUALCOMM Incorporated of San Diego, Calif., for communicating wirelessly with satellite 30. MCT 2 resides entirely onboard trailer 4. In one embodiment, MCT 2 within radome 20 as shown in FIGS. 1 and 2. In other embodiments, MCT 2, 6 uses a terrestrial wireless communication system such as Global System for Mobile communication (GSM), Code Division Multiple Access (CDMA), Universal Mobile Telecommunications System (UTMS) (or an analog or another digital cellular telephone system) to communicate with NMF 14, (through base transceiver station (BTS) 22), or a wireless data communications network (such as a digital packet data network). Further, communications may be carried out from NMF 14 using network 24 which may represent the Public Switched Telephone Network (PSTN) or a cable television network (CATV) through which wireless communications are carried out in conjunction with satellite 30 using satellite dish 32. Network 24 may also include the Internet.

Figure 3:
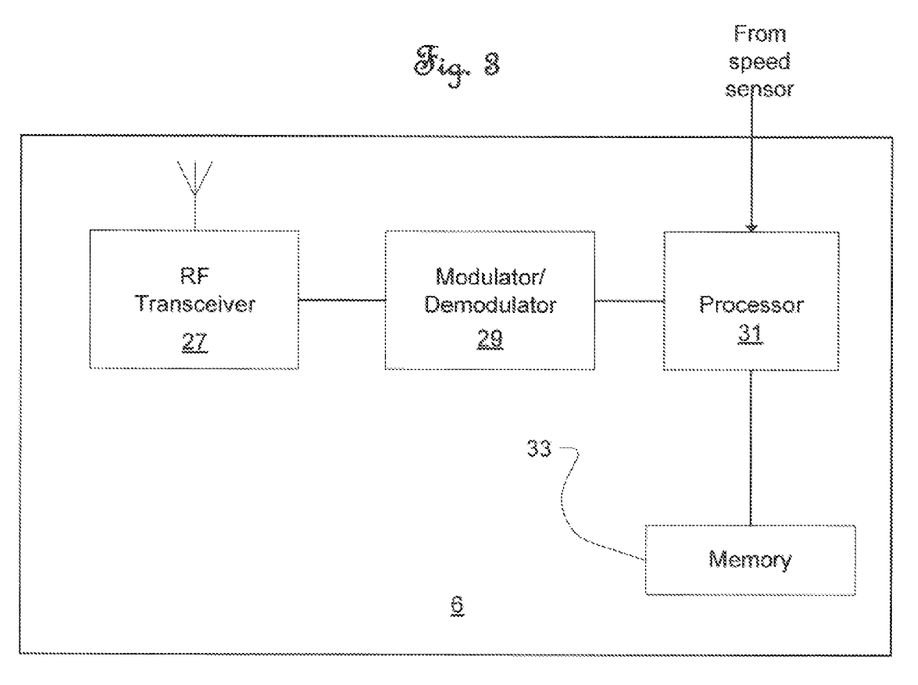
FIG. 3 illustrates a block diagram of the mobile communications terminal.

FIG. 3 illustrates a block diagram of MCT 6. With reference to FIGS. 1, 2 and 3, the MCT may have common construction for MCT 2 and MCT 6. MCT 6 and MCT 2 may serve to provide communications with remote locations such as a network management facility for instance, pursuant to untethered trailer tracking MCT 2 may be placed onboard a shipping container or trailer. Shipping containers and trailers are plentiful and there may be some hesitancy by their owners to retrofit containers or trailers or pay for new trailers or containers with very expensive communications equipment. Consequently, MCT 2 may be constructed less robustly than MCT 6. For instance, MCT 2 may need to be only Wi-Fi (IEEE 802.11b, 802.11a, 802.11g, etc.) or, ZigBee (or IEEE 802.15.4-2003) enabled. With reference still to FIG. 3, MCT 6 comprises an RF transceiver 27 for transmitting and receiving information including voice and data. The term transceiver as used herein is also contemplated to encompass a transmitter and a receiver, separate from one another, to carry out communications. High frequency communication signals are transmitted/received by RF transceiver 27, which are down-converted into baseband signals during reception and up-converted from baseband to high frequency signals during transmission. MCT 6 also comprises a modulator/demodulator 29 which provides an interface between processor 31 and RF transceiver 27, allowing information from processor 31 to be modulated in accordance with the particular wireless communications being used by MCT 6, and also to demodulate received information for use by processor 31. Modulator/demodulator 29 may also include a JAVA® virtual machine to provide platform portability between communication protocols at MCT 6 and a remote site. Processor 31 controls the various processes and functions of MCT 6. Memory 33 is an electronic memory for storing various data. MCT 6 may include an input from a speed sensor. Additionally, (and with reference to FIGS. 1, 2 and 3) processor 31 may be programmed to allow communications over wired connection 5, only when vehicle 7 is not moving.

Once the trailer or container's identification code has been determined by the tractor, communications may proceed wirelessly between tractor 8 and trailer 4 of FIGS. 1 and 2. Communications may involve, but are not limited to, security systems, reefer temperature monitoring or control, status monitoring or control of doors on trailer (open, closed or locked), and communications with other modules on trailer that can bridge communication networks existing on both tractor and trailer.

Figure 4:
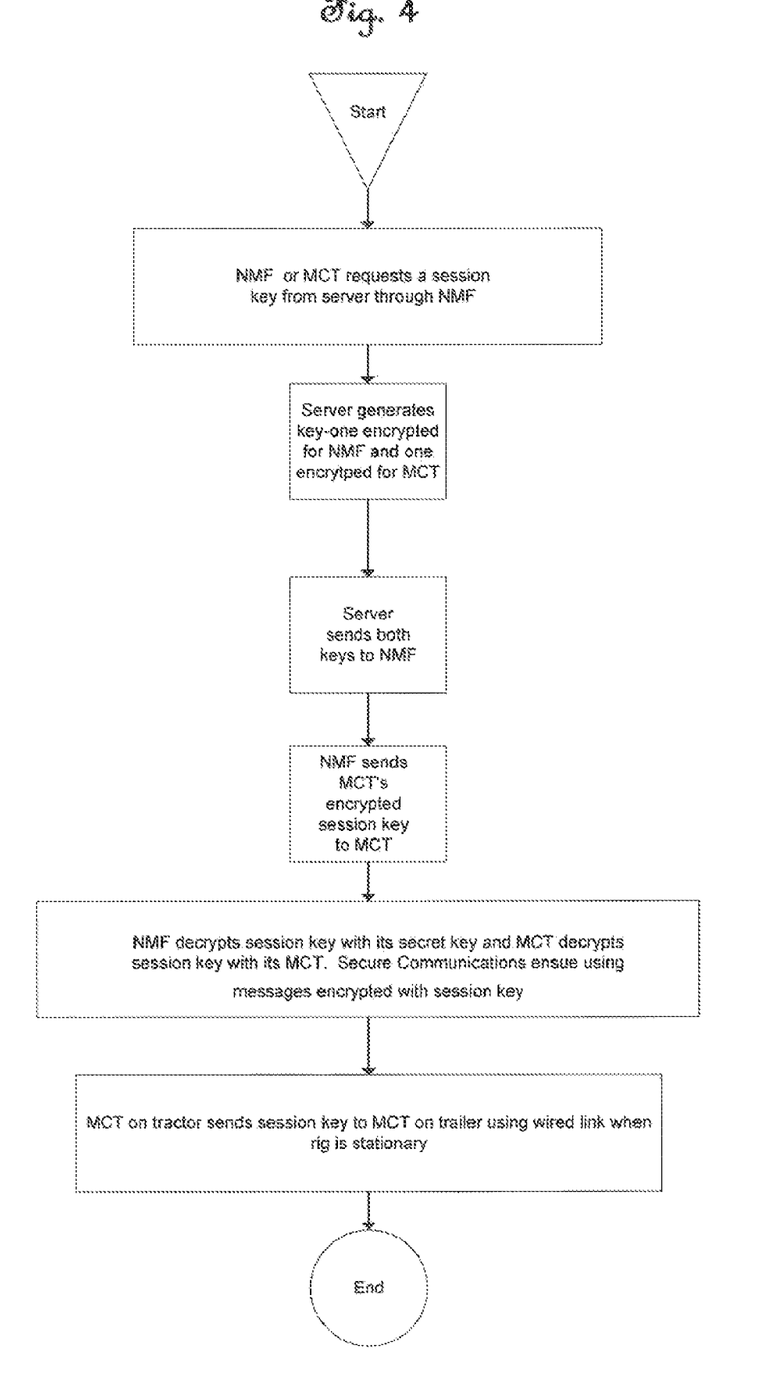
FIG. 4 illustrates a flowchart of the foregoing described symmetric cryptography encryption protocol.

Since information is being transmitted wirelessly for possible detection from a myriad of sources, well-known encryption protocols and encryption methods may be employed in connection with the communications of tractor 8 and trailer 4 of FIGS. 1 and 2. The communications system of FIG. 2 may be used to implement communications in connection with public/private key server 38. In one embodiment using symmetric cryptography, assuming that a secret key is held by NMF 14 and MCT 6, these keys are shared with server 38. MCT 2 may or may not possesses the capability to transmit data to a remote location such as a NMF 14. For the case where MCT 2 is robust enough to communicate directly with NMF 14, MCT 2 may additionally serve as a communication component of an untethered trailer tracking solution with a location service such as (but not limited to GPS, GLS, Casper, etc.), the aforementioned T2 ™ system. However, either NMF 14 or MCT 6 may request a session key from public/private key server 38 to communicate with one another. A session key is a digital key valid only during a particular session of communication between NMF 14 and MCT 6. Server 38 generates a session key (which in one aspect is randomly generated) and encrypts the session key, using the secret key of NMF 14, as well as encrypts the same session key for MCT 6 using the secret key held by MCT 6. Server 38 sends the session key, encrypted according to the secret key of NMF 14, and it sends the same session key, encrypted according to the secret key of MCT 6, to NMF 14. NMF 14 sends the session key encrypted according to MCT 6's secret key to MCT 6. MCT 6 decrypts the assigned session key (which was encrypted with its secret key) and NMF 14 decrypts its session key using its assigned secret key. Thereafter, secure communications can ensue using the session key to communicate secretly. With reference to FIG. 1, while rig 7 is stationary, MCT 6 sends its decrypted session key to MCT 2 using wired connection 5. Communications may ensue between tractor 8 (i.e. MCT 6) and trailer 4 (MCT 2) using the session key. The session keys contemplated are long enough and randomly generated so that there is little possibility of the same session key being used by another rig or other source outside of the foreseen communication links. A new session key for communication may be transmitted over wired connection 5 at spaced apart time intervals when rig 7 has come to a stop so as to ensure a good electrical connection between tractor 8 and trailer 4. Further, changing the session key periodically or from time to time provides an added level of secure communications. FIG. 4 illustrates a flowchart of the foregoing described symmetric cryptography encryption protocol.

Figure 5:
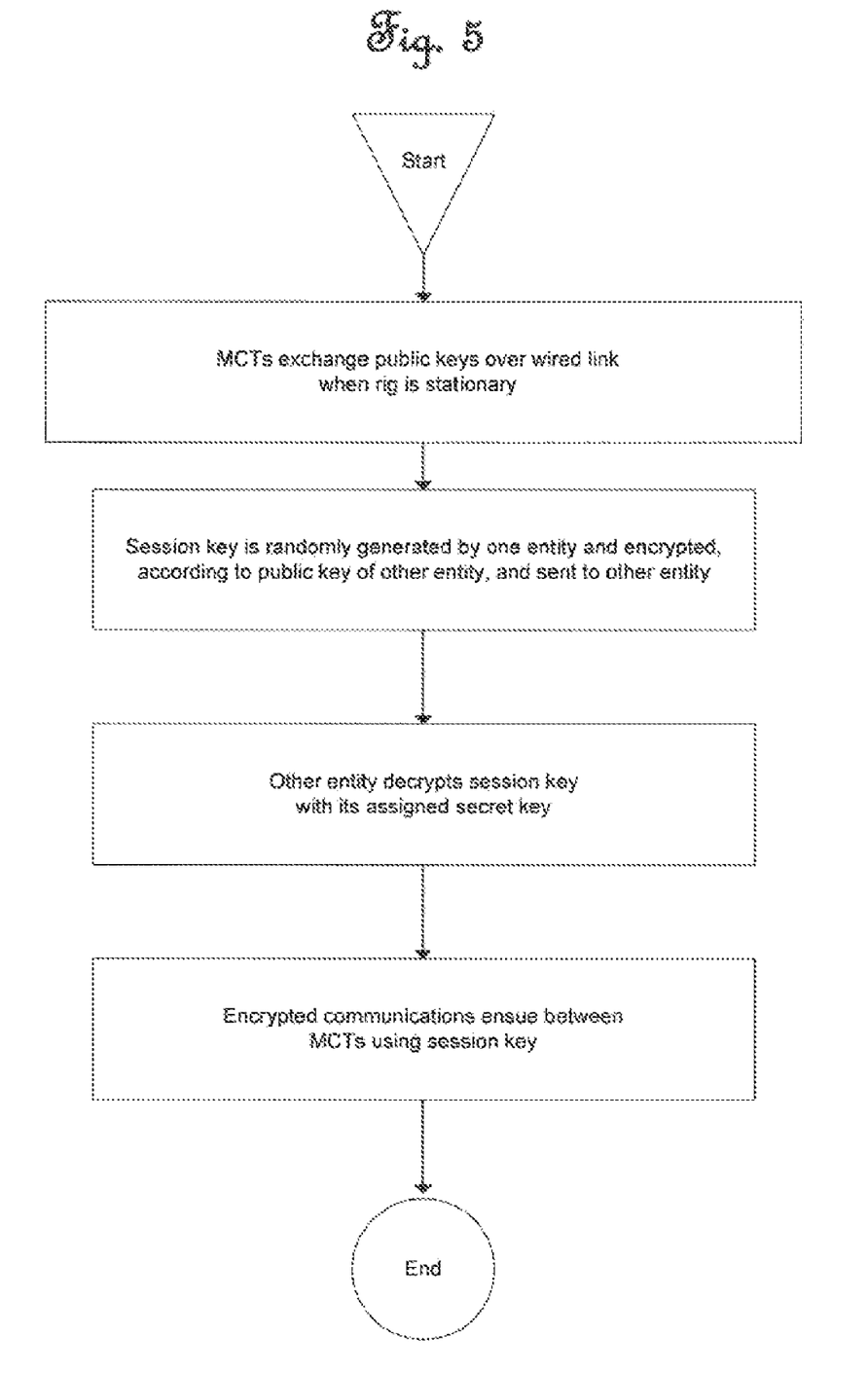
FIG. 5 illustrates a flowchart of the foregoing described public key encryption protocol.

In an alternative embodiment, during a time when rig 7 is stationary, tractor 8 and trailer 4 may exchange their respective public keys assigned to their respective MCTs (MCT 6 and MCT 2, respectively) over wired connection 5. Thereafter, when the MCTs of tractor 8 and trailer 4 communicate, a random session key is generated by one entity (MCT 2 or 6) and encrypted and dispatched according to the public key of the other entity (MCT 2 or 6) to the other entity. The entity receiving the session key encrypted according to its public key, decrypts the message using its private key. Thereafter communications proceed between tractor 8 and trailer 4 (i.e., MCT 6 and MCT 2) using the same session key. As an example, MCT 6 and MCT 2 send one another their assigned respective public keys. Public key assignments may be stored in memory 33, shown in FIG. 3, of each MCT 6 or 2. For added security, NMF 14 shown in FIG. 2 may assign the public keys used and it may change them from time to time to ensure better security. MCT 6 generates a session key encrypted according to the public key of MCT 2 and sends it to MCT 2. MCT 2 decrypts the session key using its assigned private key and communications between MCT 2 and MCT 6 ensue thereafter according to encrypted messages using the session key. FIG. 5 illustrates a flowchart of the foregoing described public key encryption protocol.

The foregoing encryption methods address the problem of intercepting wireless transmissions between tractors and trailers at for instance, truck stops and fleet yards where multiple tractors and trailers are in relatively close proximity. Further, given that trailers and containers are used to haul all manner of hazardous materials including explosives, the foregoing also address deliberate attempts to perhaps intercept a cargo manifest from unauthorized sources for perhaps a myriad of reasons. Other protocols are possible such as one based on the well-known interlock protocol often used to foil a man-in-the-middle cryptographic attack.

Although the invention herein has been described with reference to particular embodiments, it is to be understood that these embodiments are merely illustrative of the principles and applications of the present invention. For instance, while it is desirable for the rig to be stationary while exchanging information over the wired connection, it is not strictly necessary. Additionally, the foregoing may be used for communication among a tractor and one or more trailers or containers (or mix of trailers and containers and a tractor in any combination/number thereof). It is therefore to be understood that numerous modifications may be made to the illustrative embodiments and that other arrangements may be devised without departing from the spirit and scope of the present invention as defined by the appended claims.

The invention claimed is:

1. A method of communicating among at least two tethered transportation units comprising:
    exchanging identification/authentication information between a first transportation unit and a second transportation unit using a wired connection therebetween, wherein the identification/authentication information comprises a public key of the respective first and second transportation units; and
    communicating wirelessly between the first and second transportation units via a session key encrypted with the identification/authentication information.

2. The method as recited in claim 1 wherein said transportation units consist of a tractor, a container, a trailer, a dolly or a combination thereof.

3. The method as recited in claim 1 wherein said wired connection uses a conductor within a 7-pin connector.

4. The method as recited in claim 3 wherein said identification/authentication information is modulated on said conductor.

5. The method as recited in claim 1 wherein said communicating occurs using mobile communication terminals, each associated with the first and second transportation units.

6. The method as recited in claim 1 wherein said encrypted session key is decrypted with a private key associated with the respective first and second transportation units.

7. The method as recited in claim 1 wherein exchanging identification/authentication information between the first transportation unit and the second transportation unit using the wired connection is accomplished when said first and second transportation units are substantially still.

8. A method of communicating comprising:
    receiving a public key of a transportation entity over a wired connection;
    generating a substantially random session key;
    encrypting, according to said public key, said session key;
    wirelessly sending said encrypted session key to said transportation entity for decryption by said transportation entity; and
    wirelessly communicating with said transportation entity using messages encrypted according to said session key.

9. The method as recited in claim 8 wherein receiving said pubic key of said transportation entity over said wired connection occurs when said transportation entity is substantially still.

10. A method of communicating comprising:
    requesting, via a network management facility (NMF), a session key in order to communicate with a mobile communication terminal (MCT) of a transportation entity;
    receiving a first copy of a session key encrypted according to a secret key associated with said NMF and a second copy of said session key encrypted according to a secret key associated with said MCT;
    decrypting said first copy of said session key according to said secret key associated with said NMF;
    sending said second copy of said session key to said MCT over a wired connection for decryption by said MCT according to said secret key associated with said MCT; and
    communicating wirelessly with said MCT using messages encrypted according to said session key.

11. The method as recited in claim 10 wherein said transportation entity is associated with a transportation unit consisting of a trailer, a container or a dolly.

12. The method as recited in claim 10 wherein sending said second copy of said session key to said MCT over said wired connection occurs during a time said transportation entity is substantially still.

13. A first mobile communications terminal associated with a vehicle comprising:
    a transmitter/receiver;
    a memory for storing identification/authentication data of said first mobile communications terminal; and
    a processor programmed to permit exchanging, over a wired connection and only when said vehicle is substantially stationary, said identification/authentication data with identification/authentication data of a second mobile communications terminal associated with said vehicle, wherein said identification/authentication data comprises a public key of said respective first and second mobile communications terminals, and to permit communication over a wireless communication link with said second mobile communications terminals via a session key encrypted with said identification/authentication information of said second mobile communications terminal.

14. A system for communicating between a tractor and a hauled transportation unit comprising:
    a mobile communication terminal for said tractor;
    a mobile communication terminal for said hauled transportation unit;
    a wired connection coupling said mobile communication terminal of said tractor with said mobile communication terminal of said hauled transportation unit;
    a network management facility operable to dispatch a session key, wherein communications between said mobile communication terminal of said tractor and said mobile communication terminal of said hauled transportation unit occur in connection with messages encrypted according to said session key after said session key has been forwarded by said mobile communication terminal of said tractor to said mobile communication terminal of said hauled transportation unit using said wired connection.

15. The system as recited in claim 14 wherein said transportation unit consists of a container, a trailer, or a dolly.

16. The system as recited in claim 14 further including a satellite network through which communications between said network management facility and said mobile communications terminal for said tractor occur.

17. The system as recited in claim 14 further including a terrestrial network through which communications between said network management facility and said mobile communications terminal for said tractor occur.

18. The system as recited in claim 17 wherein communications between said network management facility and said mobile communications terminal for said tractor occur using one consisting of GSM, CDMA, or UTMS.

19. The system as recited in claim 14 wherein said mobile communication terminal for said hauled transportation is communication enabled according to one consisting of GSM, CDMA, UTMS, Wi-Fi, ZigBee, or a combination thereof.

20. An apparatus for communicating among at least two tethered transportation units comprising:
 means for exchanging identification/authentication information between a first transportation unit and a second transportation unit using a wired connection therebetween, wherein the identification/authentication information comprises a public key of the respective first and second transportation units; and
 means for communicating wirelessly between the first and second transportation units via a session key encrypted with the identification/authentication information.

21. The apparatus as recited in claim 20 wherein said transportation units consist of a tractor, a container, a trailer, a dolly or a combination thereof.

22. The apparatus as recited in claim 20 wherein said wired connection uses a conductor within a 7-pin connector.

23. The apparatus as recited in claim 22 wherein said identification/authentication information is modulated on said conductor.

24. The apparatus as recited in claim 20 wherein said means for communicating comprises mobile communication terminals, each associated with the first and second transportation units.

25. The apparatus as recited in claim 20 further comprising decrypting the encrypted session key with a private key associated with the respective first and second transportation units.

26. The apparatus as recited in claim 20 further comprising means for exchanging identification/authentication information between the first transportation unit and the second transportation unit using the wired connection when said first and second transportation units are substantially still.

27. An apparatus for communicating comprising:
 means for receiving a public key of a transportation entity over a wired connection;
 means for generating a substantially random session key;
 means for encrypting, according to said public key, said session key;
 means for wirelessly sending said encrypted session key to said transportation entity for decryption by said transportation entity; and
 means for wirelessly communicating with said transportation entity using messages encrypted according to said session key.

28. The apparatus as recited in claim 27 further comprising means for receiving said pubic key of said transportation entity over said wired connection occurs when said transportation entity is substantially still.

29. An apparatus for communicating comprising:
 means for requesting, via a network management facility (NMF), a session key in order to communicate with a mobile communication terminal (MCT) of a transportation entity;
 means for receiving a first copy of a session key encrypted according to a secret key associated with said NMF and a second copy of said session key encrypted according to a secret key associated with said MCT;
 means for decrypting said first copy of said session key according to said secret key associated with said NMF;
 means for sending said second copy of said session key to said MCT over a wired connection for decryption by said MCT according to said secret key associated with said MCT; and
 means for communicating wirelessly with said MCT using messages encrypted according to said session key.

30. The apparatus as recited in claim 29 wherein said transportation entity is associated with a transportation unit consisting of a trailer, a container or a dolly.

31. The apparatus as recited in claim 29 further comprising means for sending said second copy of said session key to said MCT over said wired connection during a time said transportation entity is substantially still.

32. A computer readable storage medium tangibly embodying a program of machine-readable instructions executable by a digital processing apparatus to perform a method of communicating among at least two tethered transportation units, said method comprising operations of:
 exchanging identification/authentication information between a first transportation unit and a second transportation unit using a wired connection therebetween, wherein the identification/authentication information comprises a public key of the respective first and second transportation units; and
 communicating wirelessly between the first and second transportation units via a session key encrypted with the identification/authentication information.

33. The computer readable storage medium as recited in claim 32 wherein said encrypted session key is decrypted with a private key associated with the respective first and second transportation units.

34. The computer readable storage medium as recited in claim 32 wherein exchanging identification/authentication information between the first transportation unit and the second transportation unit using the wired connection is accomplished when said first and second transportation units are substantially still.

35. A computer readable storage medium tangibly embodying a program of machine-readable instructions executable by a digital processing apparatus to perform a method of communicating, said method comprising operations of:
 receiving a public key of a transportation entity over a wired connection;
 generating a substantially random session key;
 encrypting, according to said public key, said session key;
 wirelessly sending said encrypted session key to said transportation entity for decryption by said transportation entity; and
 wirelessly communicating with said transportation entity using messages encrypted according to said session key.

36. The computer readable storage medium as recited in claim 35 wherein receiving said pubic key of said transportation entity over said wired connection occurs when said transportation entity is substantially still.

37. A computer readable storage medium tangibly embodying a program of machine-readable instructions executable by a digital processing apparatus to perform a method of communicating, said method comprising operations of:
 requesting, via a network management facility (NMF), a session key in order to communicate with a mobile communication terminal (MCT) of a transportation entity;
 receiving a first copy of a session key encrypted according to a secret key associated with said NMF and a second copy of said session key encrypted according to a secret key associated with said MCT;
 decrypting said first copy of said session key according to said secret key associated with said NMF;
 sending said second copy of said session key to said MCT over a wired connection for decryption by said MCT according to said secret key associated with said MCT; and communicating wirelessly with said MCT using messages encrypted according to said session key.

38. The computer readable storage medium as recited in claim 37 wherein sending said second copy of said session key to said MCT over said wired connection occurs during a time said transportation entity is substantially still.

* * * * *